Patented July 25, 1950

2,516,350

UNITED STATES PATENT OFFICE 2,516,350

METHOD OF ISOLATING MANNITE

Nils Andreas Sörensen and Kåre Kristensen, Trondheim, Norway

No Drawing. Application April 16, 1948, Serial No. 21,553. In Norway September 17, 1946

13 Claims. (Cl. 260—637)

The present invention relates to a method of isolating mannite from materials containing mannite, especially from seaweed or fuci.

By this method the mannite is recovered with a substantially quantitative yield and in a chemically pure condition, and at the same time none of the properties of the seaweed or fuci, as regards forming a raw material for recovery of other valuable constituents, such as alginic acid, iodine, etc., are lost.

For obtaining mannite from the raw material in question we first extract said raw material by means of water and then we cause the mannite contained in the extract so obtained to react with a carbonyl compound, whereby the mannite is transformed into a tri-acetal compound, insoluble in water. This tri-acetal compound is then separated from salts and other water soluble compounds originating from the raw material, and is hydrolyzed by means of a diluted acid, and then the mannite reformed is separated from the other carbonyl compounds, and is purified. Preferably the aqueous extract, that contains mannite and a substantial portion of the salts of the raw material, for example iodides, is concentrated by evaporation, and eventually, brought into dry condition in this manner, before being reacted with carbonyl compounds. Carbonyl compounds very suitable for the present purpose are aliphatic aldehydes or aliphatic ketones, and preferably formaldehyde or acetaldehyde is used.

Since the mannite has a tendency to become transformed into other substances by fermentation we prefer to perform the extraction of the raw material in presence of a preservative that prevents fermentation of the mannite and of the alginic acid, or of other valuable polyglucuronic acids present. Very suitable preservatives for this purpose are small quantities of fluorides, or of acids that give the liquid a pH prohibitive to the development of bacteria.

We have found it advantageous to react the mannite with carbonyl compounds in the presence of a condensation catalyst, such as $H_2SO_4$, HCl, $ZnCl_2$, $CuSO_4$, and the like. By this reaction the mannite is transformed into a tri-keto-acetal or a tri-aldehyde acetal. These tri-acetal compounds are insoluble in water. They may be separated from salts and other water soluble substances by being dissolved in a suitable solvent, for example in chloroform or ether, or they may be directly crystallized out of the solution.

According to a further feature of the invention the mother liquor, from which the tri-acetal-mannite compounds have been separated, is treated for recovering excess of carbonyl compound—say acetaldehyde—and of condensation catalyst—say HCl. This is effected by evaporation, whereby also are recovered the salts, amongst other iodides, contained in the extract.

The hydrolysis above referred to, by which the tri-acetal compounds are decomposed, preferably is performed by heating, whereby we obtain chemically pure mannite as well as the carbonyl compound used, with a quantitative yield. In order to obtain a quantitative yield in the hydrolysis operation it is sometimes, for example when formaldehyde is the carbonyl compound used, necessary to progressively remove the hydrolytically liberated carbonyl compound by distillation. If this is not done mono- and di-acetal compounds and semi-acetal compounds are formed, whereby losses of mannite occur.

Below are described examples indicating how the method may be performed.

Example I

Common seaweed is extracted by means of water in the presence of 1% NaF. This may be effected in an usual series extraction apparatus. To the extract so obtained are added 135 parts of formaldehyde solution (40%) and 100 parts of concentrated HCl solution per 100 parts of mannite contained in said extract. This mixture is heated to 100° C. for 1 hour, and is then left standing for 3-4 hours, whereby tri-formal-mannite crystallizes out. This substance is filtered off and recrystallized. Thereby are obtained 102–110 parts of pure tri-formal-mannite, F. P. 227° C. This product is hydrolyzed by being heated to 140–145° C. together with 0.2 $nH_2SO_4$, during which operation formaldehyde liberated is by and by blown off together with steam. The sulfuric acid content of the hydrolysate is removed in usual manner. The solution thus obtained contains only pure mannite, that is recovered by evaporation and crystallizing.

Example II

Common seaweed is extracted with water as described in Example I. The extract is evaporated to dryness and has added thereto 100 parts of acetaldehyde and 20 parts of concentrated hydrochloric acid per 100 parts of mannite contained in said dry extract. The mixture is left standing for 12 hours at room temperature, and the tri-ethylidene-mannite formed is filtered off and washed. If necessary it may be purified by recrystallization, say from alcohol, or by sublimation. It melts at 174° C. For hydrolysis thereof we add diluted $H_2SO_4$, say 1-2%, and distill slowly under atmospheric pressure, until all acetaldehyde is split off. This acetaldehyde is recovered and may be used over again. The hydrolysate contains only diluted $H_2SO_4$ and pure mannite, and the latter is recovered by concentration and crystallization of the solution.

We claim:

1. A method of recovering mannite from seaweed and fuci materials containing mannite, comprising extracting the material with water to remove the mannite and other water soluble substances therefrom, reacting the mannite contained in the extract so obtained with an aliphatic carbonyl compound to form a tri-acetal-compound, separating the latter from other substances in the extract, hydrolyzing the tri-acetal-compound with a diluted acid, and separating the mannite so reformed from the carbonyl compound.

2. A method as claimed in claim 1, in which the aqueous extract is concentrated prior to being reacted with a carbonyl compound.

3. A method as claimed in claim 1, in which the aqueous extract is evaporated to dryness prior to being reacted with a carbonyl compound.

4. A method as claimed in claim 1 in which the carbonyl compound used is an aliphatic aldehyde.

5. A method as claimed in claim 1 in which the carbonyl compound used is an aliphatic ketone.

6. A method as claimed in claim 1 in which the carbonyl compound used is formaldehyde.

7. A method as claimed in claim 1 in which the carbonyl compound used is acetaldehyde.

8. A method as claimed in claim 1 in which the mother liquor obtained by separation of the tri-acetal-compound is treated for recovering of an eventual excess of carbonyl compound and of condensation catalyst.

9. A method as claimed in claim 1 in which the mother liquor obtained by separation of the tri-acetal-compound is treated for recovering of salts contained therein.

10. A method as claimed in claim 1, in which the hydrolytically liberated carbonyl compound is removed by distillation as the hydrolysis proceeds.

11. A method as claimed in claim 1 in which the tri-acetal compound is separated from the other substances contained in the water extract by washing the tri-acetal compound with water.

12. A method as claimed in claim 1 in which the carbonyl compound reacted with the mannite is formaldehyde, and distilling the formaldehyde from the tri-acetal compound during the hydrolysis operation as the formaldehyde is liberated.

13. A method as claimed in claim 1 in which the carbonyl compound is formaldehyde and in which the hydrolysis of the tri-formal-mannite is effected at a temperature of from 140° to 145° C.

NILS ANDREAS SÖRENSEN.
KÅRE KRISTENSEN.

REFERENCES CITED

The following references are of record in the file of this patent:

UNITED STATES PATENTS

| Number | Name | Date |
| --- | --- | --- |
| 2,406,713 | Senkus | Aug. 27, 1946 |

FOREIGN PATENTS

| Number | Country | Date |
| --- | --- | --- |
| 545,672 | Great Britain | June 8, 1942 |

OTHER REFERENCES

Meunier, Annales de Chemie, Ser. 6, vol. 22, pages 412-23 and 430-32 (1891).

Senkus, Ind. Eng. Chem., vol. 38, 913-16 (1946).

Schulz et al., Berichte, vol. 27, 1892-3 (1894).